United States Patent
Smith

[11] 3,770,994
[45] Nov. 6, 1973

[54] INFINITELY ADJUSTABLE BEARING MOUNTING ASSEMBLY

[75] Inventor: Claude A. Smith, Sandusky, Ohio

[73] Assignee: General Motors Corporation, Detroit, Mich.

[22] Filed: Oct. 16, 1972

[21] Appl. No.: 297,916

[52] U.S. Cl. ............................................. 308/207
[51] Int. Cl. ......................................... F16c 19/00
[58] Field of Search ....................... 308/207, 207.1

[56] References Cited
UNITED STATES PATENTS
2,702,868   2/1955   Kindig ............................... 308/207

Primary Examiner—Charles J. Myhre
Assistant Examiner—Frank Susko
Attorney—W. S. Pettigrew et al.

[57] ABSTRACT

An automotive differential has a differential case rotatably mounted in a differential carrier by a pair of spaced bearing means which are infinitely adjustable to accurately center the differential case in the differential carrier. Each of the bearing means are adjustable by virtue of a shim having ramps on one face which engage cooperating ramps on the outer race of a tapered roller bearing having a thrust capacity in one direction. Adjustment is effected by relative rotation between the shim and the outer race and is maintained by an arcuate strip deformed into interlocking engagement with serrations on the shim and the bearing outer race.

3 Claims, 3 Drawing Figures

PATENTED NOV 6 1973  3,770,994

INFINITELY ADJUSTABLE BEARING MOUNTING ASSEMBLY

My invention relates generally to bearing mounting assemblies and more specifically to adjustable bearing mounting assemblies.

In the past, adjustable bearing mounting assemblies have included expandable shims comprising relatively rotatable elements having cooperating ramp surfaces. See for instance the U.S. Pat. No. 2,702,868 issued to Arnie J. Kindig on Feb. 22, 1955 for a Conveyor Roll Assembly and the U.S. Pat. No. 1,821,976 issued to Ludwig Holland-Letz on Sept. 8, 1931 for a Device For Taking Up The Wear On Antifriction Bearings. These already known adjustable bearing mounting assemblies, however, use complicated or cumbersome structure for maintaining the relative positions of the shim elements once the adjustment has been made and in the case of the former patent little or no adjustment is available because registration between the relatively rotatable shim elements is required in order to interlock the rotatable elements in an adjusted position.

Broadly, the object of my invention is to provide an adjustable bearing mounting assembly having an expandable shim comprising relatively rotatable elements with cooperating ramp surfaces in which the shim elements are interlocked in an adjusted position with a simple, compact device.

Another object of my invention is to provide an adjustable bearing mounting assembly having an expandable shim comprising relatively rotatable elements with cooperating ramps which is infinitely adjustable within the limits of ramp engagement.

Another object of my invention is to provide an adjustable bearing mounting assembly having an expandable shim comprising relatively rotatable elements with cooperating ramps in which the elements are interlocked in an adjusted position by a locking strip deformed by a bearing block and cap assembly.

Still yet another object of my invention is to provide an adjustable bearing mounting assembly having an expandable shim comprising relatively rotatable elements which are interlocked in an adjusted position by a deformable strip which requires no registration between the elements themselves or between the elements and the bearing block and cap assembly.

Still another object of my invention is to provide an adjustable bearing mounting assembly having a rotor supported in spaced, infinitely adjustable bearing means for accurately centering the rotor.

Yet another object of my invention is to provide an adjustable bearing mounting assembly having a rotor supported in antifriction bearings seated in spaced bearing block and cap assemblies wherein each of the antifriction bearings are associated with an expandable shim which is infinitely adjustable to accurately center the rotor.

The exact nature of this invention as well as other objects and advantages thereof will be readily apparent from consideration of the following specification relating to the annexed drawing in which.

Figure 1:
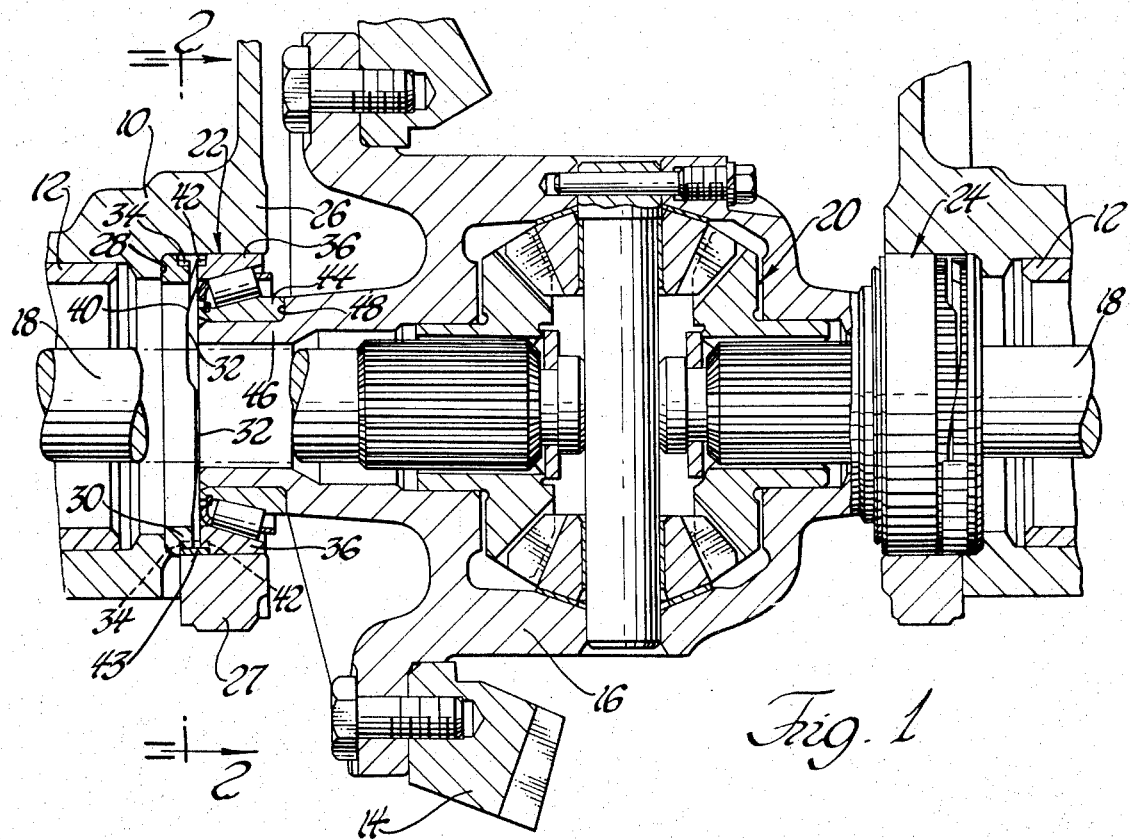
FIG. 1 is an axial sectional view of a portion of an automotive differential having a differential case rotatably mounted in a differential carrier in accordance with my invention.
Figure 2:
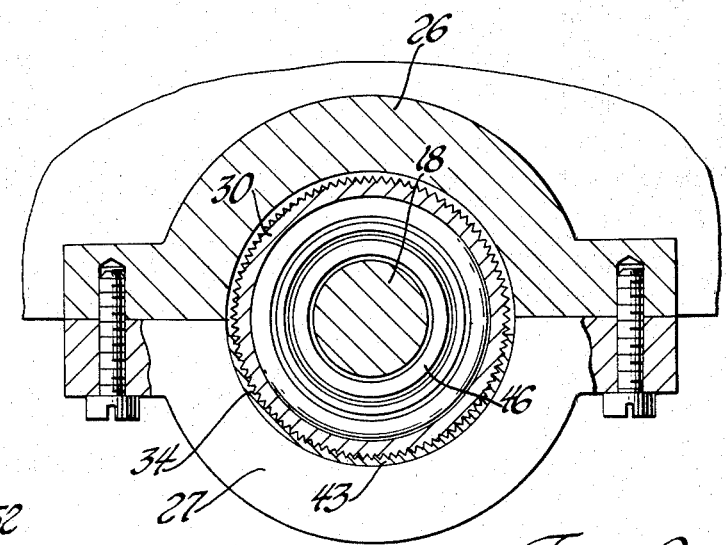
FIG. 2 is a section view taken substantially along the line 2—2 of FIG. 1 showing the bearing means for one end of the differential case.

Referring now to the drawings and more specifically to FIGS. 1 and 2, the typical automotive differential includes a stationary differential carrier 10 connected to the rear wheel axle housings 12 for securement to the underside of the automobile. Motive power is fed into the differential through a pinion gear on the end of a drive shaft (not shown) which meshes with a ring gear 14. The ring gear 14 and a differential case 16 to which it is attached are rotated in the stationary differential carrier 10 by the pinion gear.

The rotary motion of the differential case 16 is imparted to the drive axles 18 and wheels (not shown) through a bevel gear set 20 which permits the drive axles 18 to be driven at different speeds. Efficient operation of the differential depends on the elimination of end play between the differential case 16 and the differential carrier 10 and the precise centering of the differential case 16 in the differential carrier 10 for proper meshing engagement of the ring gear 14 with the pinion gear (not shown). To this end, the differential case 16 is rotatably supported in the differential carrier 10 by infinitely adjustable bearing means indicated generally at 22 and 24 respectively.

The bearing means 22 includes a bearing block 26 and a thrust shoulder 28 integrally formed in the differential carrier 10 and a bearing cap 27 bolted to the bearing block 26. Mounted in the bore formed by bearing block 26 and bearing cap 27 is a shim element 30. One face of the shim element 30 lies against the thrust shoulder 28 and the other face of the shim element 30 is provided with a plurality of circumferentially spaced ramps 32 rising axially. The end portion of the outer surface of the shim element 30 adjacent the ramped face is depressed and has serrations 34.

The cup or outer race 36 of a tapered roller bearing 38 is also mounted in the bore formed by the bearing block 26 and bearing cap 27 with its larger end face juxtaposed to the shim element 30. The larger end face of the outer race 36 also has a plurality of axially rising circumferentially spaced ramps 40. The ramps 40 engage the ramps 32 on the shim element 30 and thus the shim element 30 and the outer race 36 constitute the relatively rotatable elements of an expandable shim. Depressed serrations 42 are provided in the outer surface of the outer race 36 at its larger end.

An arcuate soft steel locking strip 43 of approximately 170° is disposed between the bearing cap 27 and the serrations 34 and 42. The inner marginal portion of the locking strip 43 is deformed into interlocking engagement with the serrations 34 and 42 preventing relative rotation between the outer race 36 and the shim element 30.

The cone or inner race 44 of the tapered roller bearing is press fitted onto a reduced end portion 46 of the differential case 16 against a thrust shoulder 48. The bearing means 22 thus carries the thrust loads of the differential case in only a single direction, that is, toward the left as viewed in FIG. 1.

The bearing means 24 at the opposite end of the differential case 16 is identical to the bearing means 22 except that it is reversed or opposed to the bearing means 24 and thus carries the thrust load in the opposite direction or toward the right as viewed in FIG. 1.

The elimination of end play between the differential case 16 and the differential carrier 10 and the centering of the differential case 16 in the carrier 10 is achieved during the assembly of the differential case 16 to the differential carrier 10.

In the assembly operation, The differential case 16 with tapered roller bearings installed on each end is supported in the carrier by the bearing outer races seated in the bearing blocks. A shim element is placed in each of the bearing blocks either before, after or concurrently with seating the outer races in the bearing blocks. The bearing means 22 and 24 are then adjusted, for example, by rotating the shim element 30 relative to the outer race 36 in the bearing means 22.

Relative rotation in one direction cams the shim element 30 and outer race 36 apart through action of the ramps 32 and 40. The bearing means 22 can be so adjusted until all of the end play between the differential case 16 and the differential carrier 10 is eliminated and further until both of the bearing means are preloaded to any desired degree. However, the differential case 16 is preferably accurately centered in the differential carrier 10 by selectively adjusting both the bearing means 22 and 24 either with or without preload.

Once adjusted the adjustment of the bearing means 22 is maintained by placing the arcuate locking strip 43 which initially has a smooth inner periphery over the portions of the serrations 34 and 42 which are exposed from the bearing block 26. The bearing cap 27 is then tightly bolted to the bearing block 26 deforming the inner peripheral portion of the locking strip 43 into interlocking engagement with serrations 34 and 42. The interlocking engagement of the deformed locking strip 43 prevents relative rotation between the bearing race 36 and the shim element 30 thus maintaining the adjustment. At this point it should be noted that the bearing means 22 is infinitely adjustable at any point between the limits of the ramps 32 and 40 as the locking strip 43 does not require any specific angular disposition of the shim element 30 and the outer race 36 relative to each other or to the bearing block 26 or bearing cap 27. The adjustment of the bearing means 24 is maintained in the same manner and is likewise infinitely adjustable.

Figure 3:
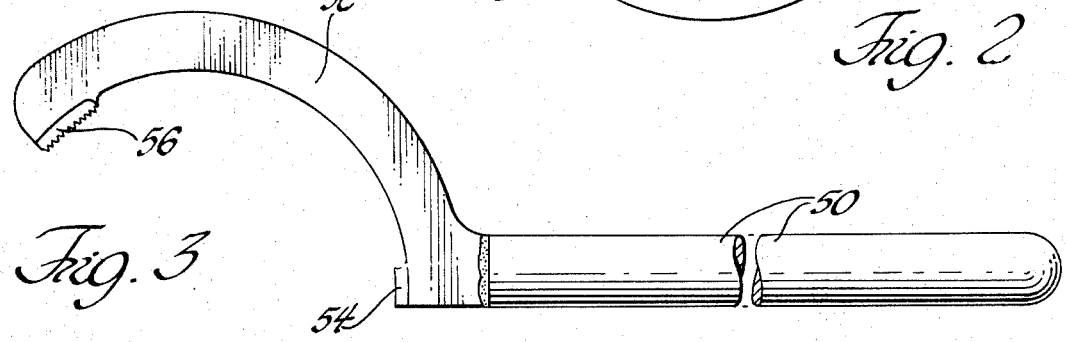
FIG. 3 is a plan view of a tool used to adjust the bearing means shown in FIG. 2.

FIG. 3 shows a tool for adjusting the bearing means. The tool comprises a handle 50 with an arcuate work head 52 which is substantially less than 180°. The tool has a reaction pad 54 at the end where it joins the handle 50 and a serrated gripper 56 at the opposite end. The tool is capable of turning either the shim element or the outer bearing race while it is in the bearing block by meshing the serrated gripper 56 with the serrations on either the shim element or race near one end of the bearing block and resting the reaction pad on the serrations. Leverage is then applied to the handle 50 toward the other end of the bearing block turning the shim element or bearing race until the handle reaches the other end of the bearing block.

While an automotive differential has been described in the disclosure of my invention, it is to be understood that my invention is not limited to an automotive differential but encompasses bearing mounting assemblies wherein any type of rotor is accurately supported without end play.

Further the foregoing disclosure relates to only a preferred embodiment of my invention and it is intended to cover all changes and modifications of the example of my invention herein chosen for the purposes of the disclosure, which do not constitute departures from the spirit and scope of my invention.

I claim:

1. A bearing mounting assembly comprising:
a carrier,
a rotor disposed in said carrier, and
a pair of axially spaced bearing means rotatably supporting and centering said rotor in said housing,
one of said bearing means including a stationary bearing block in said carrier,
an antifriction bearing mounted on said rotor and having outer race means disposed in said bearing block, said outer race means having a radial face and serrations on an end portion of its outer surface adjacent said radial face,
a shim element coaxially disposed in said bearing block, said shim element having a radial face and serrations on an end portion of its outer surface, said radial faces having a plurality of axially rising ramps engaging each other in an adjusted position to locate said rotor axially in said carrier,
a locking strip having an inner peripheral portion deformed into interlocking engagement with said serrations on said outer race means and said serrations on said shim element to maintain said adjusted position, and
a bearing cap engaging the outer peripheral surface of said locking strip secured to said bearing block.

2. A bearing mounting assembly comprising:
a carrier having first and second axially spaced bearing blocks,
a rotor disposed in said carrier,
a first bearing means including said first bearing block rotatably supporting said rotor in said housing and limiting axial movement of said rotor in said housing in a single axial direction,
an infinitely adjustable bearing means including said second bearing block rotatably supporting said rotor in said carrier and limiting axial movement of said rotor in said carrier in a single axial direction opposite to said first mentioned axial direction,
said infinitely adjustable bearing means further including an antifriction bearing having an outer race with a plurality of circumferentially spaced ramps on a radial face thereof and serrations on an end portion of its outer surface adjacent said radial face disposed in said second bearing block,
a shim element coaxially disposed in said second bearing block, said shim element having a plurality of circumferentially spaced ramps on a radial face thereof and serrations on an end portion of its outer surface, said ramps on said shim element engaging said ramps on said outer race in an adjusted position to locate said rotor axially in said carrier,
a locking strip having an inner peripheral portion deformed into interlocking engagement with said serrations on said outer race and said serrations on said shim element to maintain said adjusted position, and
a bearing cap engaging the outer peripheral surface of said locking strip secured to said second bearing block.

3. A bearing mounting assembly comprising:
a carrier,
a rotor disposed in said carrier, and a pair of axially spaced, infinitely adjustable bearing means rotatably supporting and centering said rotor in said housing in an adjusted position, each of said infinitely adjustable bearing means including a stationary bearing block with a thrust shoulder at one end in said carrier, a shim element disposed in said bearing block against said thrust shoulder, said shim element having a plurality of circumferentially spaced ramps on a radial face thereof remote from said thrust shoulder and depressed serrations on the end portion of its outer surface adjacent said radial face, an angular contact antifriction bearing having an outer race with a plurality of circumferentially spaced ramps on a radial face thereof and depressed serrations on an end portion of its outer surface adjacent said radial face disposed in said bearing block with said ramps engaging the ramps on said shim element in an adjusted position, a locking strip having an inner peripheral portion deformed into interlocking engagement with said serrations on said outer race and said serrations on said shim element to maintain said adjusted position, and a bearing cap engaging the outer peripheral surface of said locking strip secured to said stationary bearing block.

* * * * *

PO-1050
(5/69)

UNITED STATES PATENT OFFICE
CERTIFICATE OF CORRECTION

Patent No. 3,770,994          Dated November 6, 1973

Inventor(s) Claude A. Smith

It is certified that error appears in the above-identified patent and that said Letters Patent are hereby corrected as shown below:

Column 4, line 8, after "said" (second occurrence) delete "housing" and insert -- carrier --; line 35, after "said" (second occurrence) delete "housing" and insert -- carrier --; line 37 after "said" delete "housing" and insert -- carrier --.

Column 5, line 3 after "said" delete "housing" and insert -- carrier --.

Signed and sealed this 16th day of July 1974.

(SEAL)
Attest:

McCOY M. GIBSON, JR.
Attesting Officer

C. MARSHALL DANN
Commissioner of Patents